United States Patent
Chen et al.

(10) Patent No.: US 7,770,460 B1
(45) Date of Patent: Aug. 10, 2010

(54) PRESSURE GAUGE

(76) Inventors: Kuo-Liang Chen, No. 246-1, Changma Rd., Changhua (TW); Yao-Yi Chen, No. 107, Jiatie Rd., Hemei Chen, Changhua Hsien (TW)

( * ) Notice: Subject to any disclaimer, the term of this patent is extended or adjusted under 35 U.S.C. 154(b) by 0 days.

(21) Appl. No.: 12/490,434

(22) Filed: Jun. 24, 2009

(51) Int. Cl.
*G01L 7/00* (2006.01)

(52) U.S. Cl. ........................................................ 73/756

(58) Field of Classification Search ................... 73/756, 73/861.47, 38; 128/205.24; 604/30
See application file for complete search history.

(56) References Cited

U.S. PATENT DOCUMENTS

| | | | | |
|---|---|---|---|---|
| 3,808,876 A | * | 5/1974 | Kershaw | 73/38 |
| 5,426,985 A | * | 6/1995 | Warner et al. | 73/861.47 |
| 5,730,323 A | * | 3/1998 | Osborne | 222/55 |
| 5,755,683 A | * | 5/1998 | Houle et al. | 604/30 |
| 5,829,460 A | * | 11/1998 | Acevedo | 134/102.2 |
| 6,116,242 A | * | 9/2000 | Frye et al. | 128/205.24 |

* cited by examiner

*Primary Examiner*—Jewel Thompson
(74) *Attorney, Agent, or Firm*—Frenkel & Associates, PC

(57) ABSTRACT

A pressure gauge has a base, a control knob, a pressure detector, a display and a cover. The base has a chamber, an inlet tube, an outlet tube and a controlling tube. The controlling tube has an inner end protruding into the chamber of the base and communicating with the inlet tube. The control knob is mounted rotatably on the controlling tube to open or close a communication between the inner end of the controlling tube and the inlet tube. The pressure detector is mounted in the chamber to detect air pressure in the base. The display is mounted in the chamber of the base and is connected electrically to the pressure detector to display the air pressure detected by the pressure detector. The cover is attached detachably on the base to close the chamber and has a window from which the display is exposed.

10 Claims, 4 Drawing Sheets

PRESSURE GAUGE

BACKGROUND OF THE INVENTION

1. Field of the Invention

The present invention relates to a pressure gauge, and more particularly to a pressure gauge having a compact volume.

2. Description of Related Art

With reference to FIG. 5, a conventional pressure gauge (50) for detecting and displaying air pressure in a pipe system comprises a tubular body (51), a control knob (52) and a display (53). The tubular body (51) is connected to and communicates with a pipe system and has a connecting tube (511) formed on and protruding from a middle portion of the tubular body (51). The control knob (52) is attached rotatably to the tubular body (51) to open or close of the communication of and airflow passing through the tubular body (51). The display (53) is mounted on one end of the connecting tube (511) opposite to the tubular body (51) to display the air pressure in the tubular body (51).

However, the display (53) of the conventional pressure gauge (50) is attached to the connecting tube (511) and away from the tubular body (51), so the conventional pressure gauge (50) is not compact and takes a large space for installing on the pipe system. Therefore, the install and operation of the conventional pressure gauge (50) is inconvenient.

To overcome the shortcomings, the present invention tends to provide a pressure gauge to mitigate or obviate the aforementioned problems.

SUMMARY OF THE INVENTION

The main objective of the invention is to provide a pressure gauge having a compact volume to reduce a space for installing on a pipe system and convenient in use. The pressure gauge has a base, a control knob, a pressure detector, a display and a cover. The base has two opposite sides, a chamber, an inlet tube, an outlet tube and a controlling tube. The chamber is defined in the base. The inlet tube and the outlet tube are respectively formed on and protrude from the opposite sides of the base. The controlling tube is formed on the base and has an outer end protruding out from the base and an inner end protruding into the chamber of the base and communicating with the inlet tube. The control knob is mounted rotatably on the controlling tube to open or close a communication between the inner end of the controlling tube and the inlet tube. The pressure detector is mounted in the chamber to detect air pressure in the base. The display is mounted in the chamber of the base and is connected electrically to the pressure detector to display the air pressure detected by the pressure detector. The cover is attached detachably on the base to close the chamber and has a window from which the display is exposed.

With such an arrangement, the pressure gauge in accordance with the present invention is compact and has a decreased volume. The space for installing and operating the pressure gauge on a pipe system is reduced, and the pressure gauge is convenient in use and operation.

Other objects, advantages and novel features of the invention will become more apparent from the following detailed description when taken in conjunction with the accompanying drawings.

DETAILED DESCRIPTION OF PREFERRED EMBODIMENT

Figure 1:
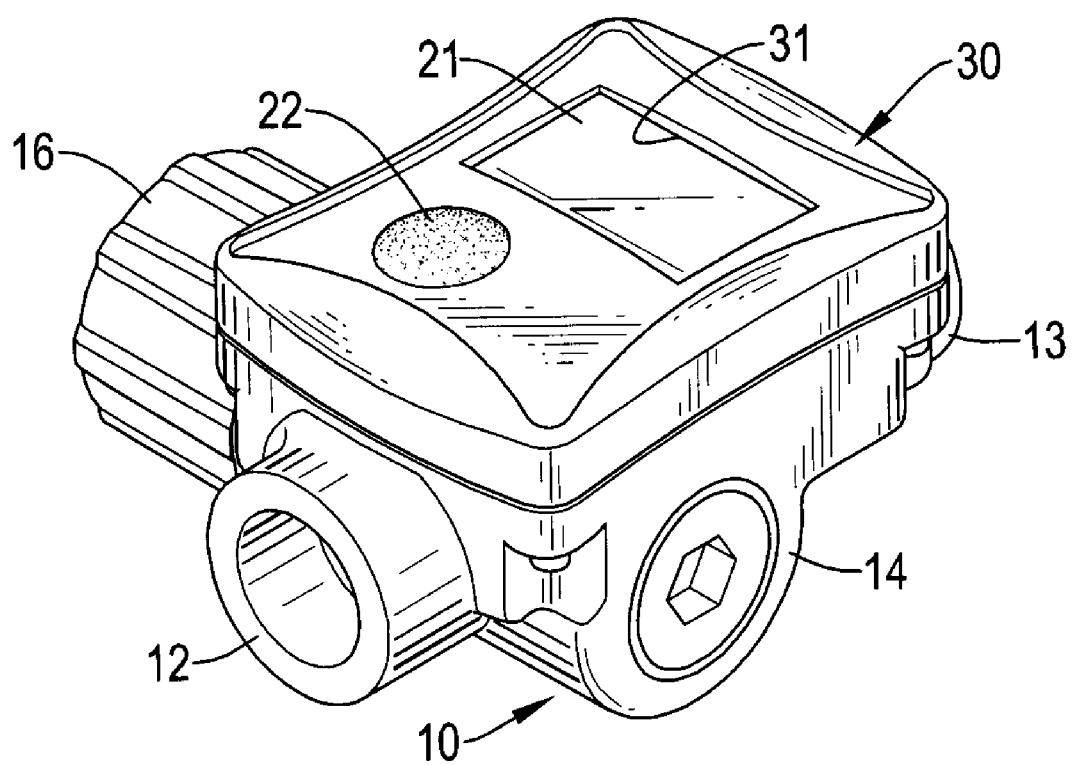
FIG. 1 is a perspective view of a pressure gauge in accordance with the present invention.
Figure 2:
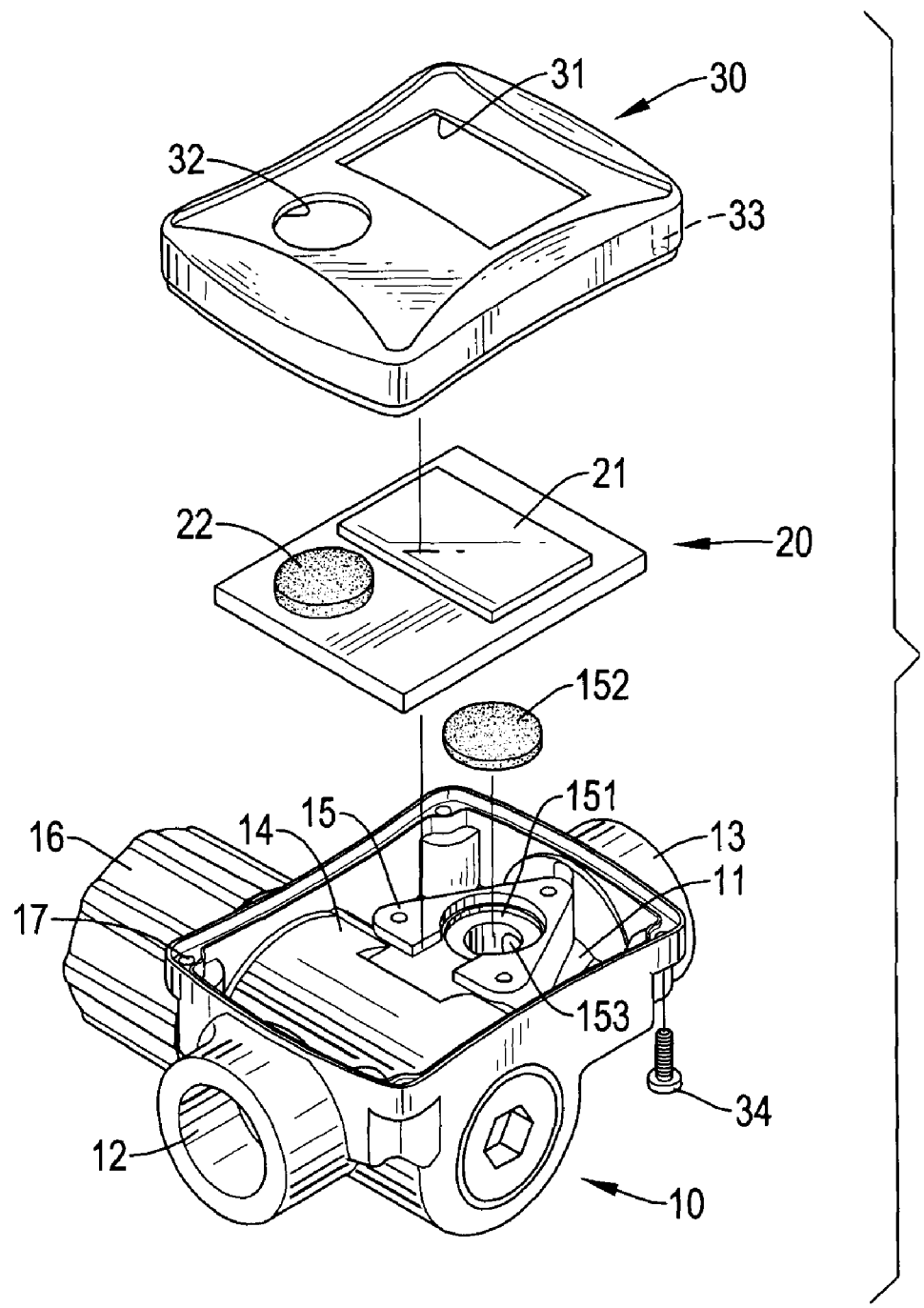
FIG. 2 is an exploded perspective view of the pressure gauge in FIG. 1.
Figure 3:
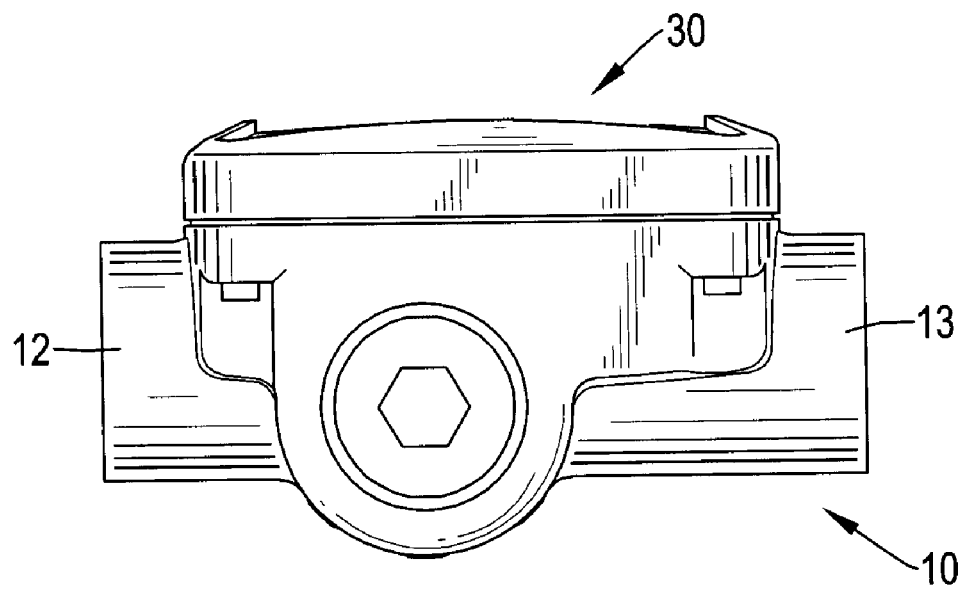
FIG. 3 is a side view of the pressure gauge in FIG. 1.
Figure 4:
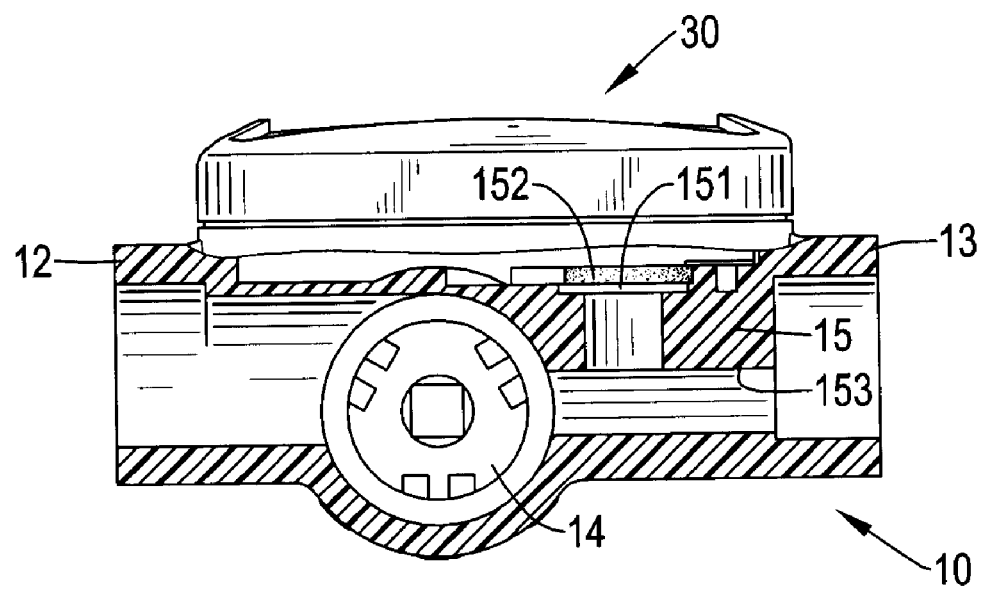
FIG. 4 is side view in partial section of the pressure gauge in FIG. 1.
Figure 5:
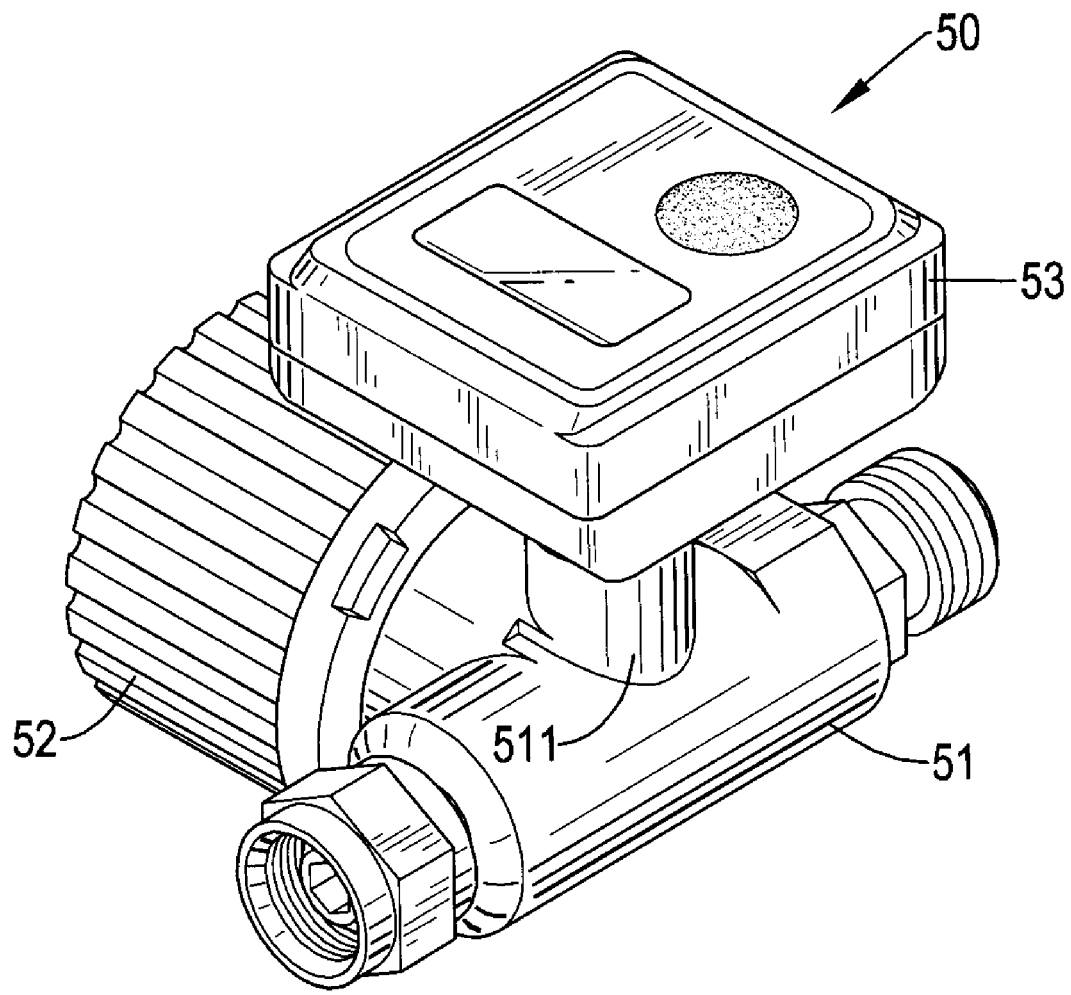
FIG. 5 is a perspective view of a conventional pressure gauge in accordance with the prior art.

With reference to FIGS. 1 to 4, a pressure gauge in accordance with the present invention comprises a base (10), a control knob (16), a pressure detector (152), a display (20) and a cover (30). The base (10) may be rectangular and comprises two opposite sides, a chamber (11), an inlet tube (12), an outlet tube (13), a controlling tube (14), a detector mount (15) and multiple through holes (17). The chamber (11) is defined in the base (10). The inlet tube (12) and the outlet tube (13) are respectively formed on and protrude from the opposite sides of the base (10) and align and communicate with each other. The controlling tube (14) is formed on the base (10) and has an outer end and an inner end. The outer end of the controlling tube (14) protrudes out from the base (10). The inner end of the controlling tube (14) protrudes into the chamber of the base (10) and communicates with the inlet tube (12). The detector mount (15) is formed in the base (10) and comprises a top, a holding recess (151) and a passage (153). The holding recess (151) is defined in the top of the detector mount (15). The passage (153) is defined in the detector mount (15) and communicates with the outlet tube (13), the inner end of the controlling tube (14) and the holding recess (151). The through holes (17) are defined through the base (10) and are arranged around the chamber (11).

The control knob (16) is mounted rotatably on the controlling tube (14) to open or close a communication between the inner end of the controlling tube (14) and the inlet tube (12). The control knob (16) may be conventional, so detail description about the control knob (16) is omitted.

The pressure detector (152) is mounted in the chamber (11), may be mounted in the holding recess (151) in the detector mount (15) to detect air pressure in the base (10), especially in the passage (153) of the detector mount (15) or the outlet tube (13).

The display (20) is mounted in the chamber (11) of the base (10) and is connected electrically to the pressure detector (152) to display the air pressure detected by the pressure detector (152). The display (20) comprises a monitor (21) and a control button (22). The monitor (21) is mounted on the display (20) to display the air pressure detected by the pressure detector (152). The control button (151) is mounted on the display (20) and is connected electrically to the monitor (21).

The cover (30) is attached detachably on the base (10) to close the chamber (11) and has a bottom, a window (31), a button hole (32) and multiple securing holes (33). The window (31) is defined through the cover (30), and the monitor (21) is exposed from the window (31) in the cover (30). The button hole (32) is defined through the cover (30), and the control button (22) is exposed from the button hole (32). The securing holes (33) may be threaded, are defined in the bottom of the cover (30) and align respectively with the through holes (17) in the base (10). Multiple fasteners (34) are mounted respectively through the through holes (17) in the base (10) and are securely mounted respectively in the securing holes (33) in the cover (30) to securely combine the cover (30) with the base (10).

In use, the base (10) is connected to a pipe system with the inlet tube (12) and the outlet tube (13). When the control knob (16) is turned to open the communication between the inlet tube (12) and the controlling tube (14), air in the pipe system will enter the base (10) via the inlet tube (12) and flow out of the base (10) via the outlet tube (13). Consequently, the pressure detector (152) can detect the air pressure passing through the base (10) and show the detected pressure on the monitor (31) on the display (30).

Because the display (30) is held in the chamber (11) of the base (10), the pressure gauge in accordance with the present invention is compact and has a decreased volume. Therefore, the space for installing and operating the pressure gauge on a pipe system is reduced, and the pressure gauge is convenient in use and operation.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pressure gauge comprising:
    a base comprising
        two opposite sides;
        a chamber defined in the base;
        an inlet tube and an outlet tube respectively formed on and protruding from the opposite sides of the base; and
        a controlling tube formed on the base and having an outer end protruding out from the base and an inner end protruding into the chamber of the base and communicating with the inlet tube;
    a control knob mounted rotatably on the controlling tube to open or close a communication between the inner end of the controlling tube and the inlet tube;
    a pressure detector mounted in the chamber to detect air pressure in the base;
    a display mounted in the chamber of the base and connected electrically to the pressure detector to display the air pressure detected by the pressure detector; and
    a cover attached detachably on the base to close the chamber and having a window from which the display is exposed.

2. The pressure gauge as claimed in claim 1, wherein the display comprises
    a monitor mounted on the display to display the air pressure detected by the pressure detector and exposed from the window in the cover; and
    a control button mounted on the display and connected electrically to the monitor; and
    the cover further has a button hole defined through the cover and from which the control button is exposed.

3. The pressure gauge as claimed in claim 2, wherein the base further has a detector mount formed in the base and comprising
    a top;
    a holding recess defined in the top of the detector mount and in which the pressure detector is mounted; and
    a passage defined in the detector mount and communicating with the outlet tube, the controlling tube and the holding recess.

4. The pressure gauge as claimed in claim 3, wherein
    the base has multiple through holes defined through the base and arranged around the chamber;
    the cover has a bottom and multiple securing holes defined in the bottom of the cover and aligning respectively with the through holes in the base; and
    multiple fasteners mounted respectively through the through holes in the base and securely mounted respectively in the securing holes in the cover to securely combine the cover with the base.

5. The pressure gauge as claimed in claim 4, wherein the base is rectangular.

6. The pressure gauge as claimed in claim 5, wherein an inlet tube and an outlet tube align with each other.

7. The pressure gauge as claimed in claim 1, wherein the base further has a detector mount formed in the base and comprising
    a top;
    a holding recess defined in the top of the detector mount and in which the pressure detector is mounted; and
    a passage defined in the detector mount and communicating with the outlet tube, the controlling tube and the holding recess.

8. The pressure gauge as claimed in claim 1, wherein
    the base has multiple through holes defined through the base and arranged around the chamber;
    the cover has a bottom and multiple securing holes defined in the bottom of the cover and aligning respectively with the through holes in the base; and
    multiple fasteners mounted respectively through the through holes in the base and securely mounted respectively in the securing holes in the cover to securely combine the cover with the base.

9. The pressure gauge as claimed in claim 1, wherein the base is rectangular.

10. The pressure gauge as claimed in claim 1, wherein an inlet tube and an outlet tube align with each other.

* * * * *